United States Patent [19]

Chatterjea

[11] Patent Number: 4,552,168

[45] Date of Patent: Nov. 12, 1985

[54] STABILIZER FOR PRIORITY FLOW DIVIDER VALVE

[75] Inventor: Probir K. Chatterjea, Mount Prospect, Ill.

[73] Assignee: J. I. Case Company, Racine, Wis.

[21] Appl. No.: 610,894

[22] Filed: May 15, 1984

[51] Int. Cl.⁴ .............................................. G05D 11/03
[52] U.S. Cl. ...................... 137/101; 60/422; 137/116
[58] Field of Search .................... 137/101, 116; 60/422

[56] References Cited

U.S. PATENT DOCUMENTS

| Re. 24,892 | 10/1960 | Banker. |  |
|---|---|---|---|
| 2,995,141 | 8/1961 | Hipp. |  |
| 3,114,380 | 12/1963 | Allen. |  |
| 3,123,089 | 3/1964 | Thrap et al. |  |
| 3,125,110 | 3/1964 | Allen et al. |  |
| 3,334,705 | 8/1967 | Lam | 60/422 X |
| 3,916,932 | 11/1975 | Thorson. |  |
| 4,116,001 | 9/1978 | Orth | 60/422 X |
| 4,192,337 | 3/1980 | Alderson | 137/101 |

Primary Examiner—Alan Cohan
Attorney, Agent, or Firm—Cullen, Sloman, Cantor, Grauer, Scott & Rutherford

[57] ABSTRACT

The present invention is a stabilizer for steering priority flow divider valves. The present invention prevents the variable displacement pump of the steering hydraulic system from destroking to zero displacement when the steering hydraulic demand rapidly varies from a high level to a low level of demand. The use of the present invention is especially advantageous in hydraulic systems which are close centered with pressure and flow compensation.

21 Claims, 3 Drawing Figures

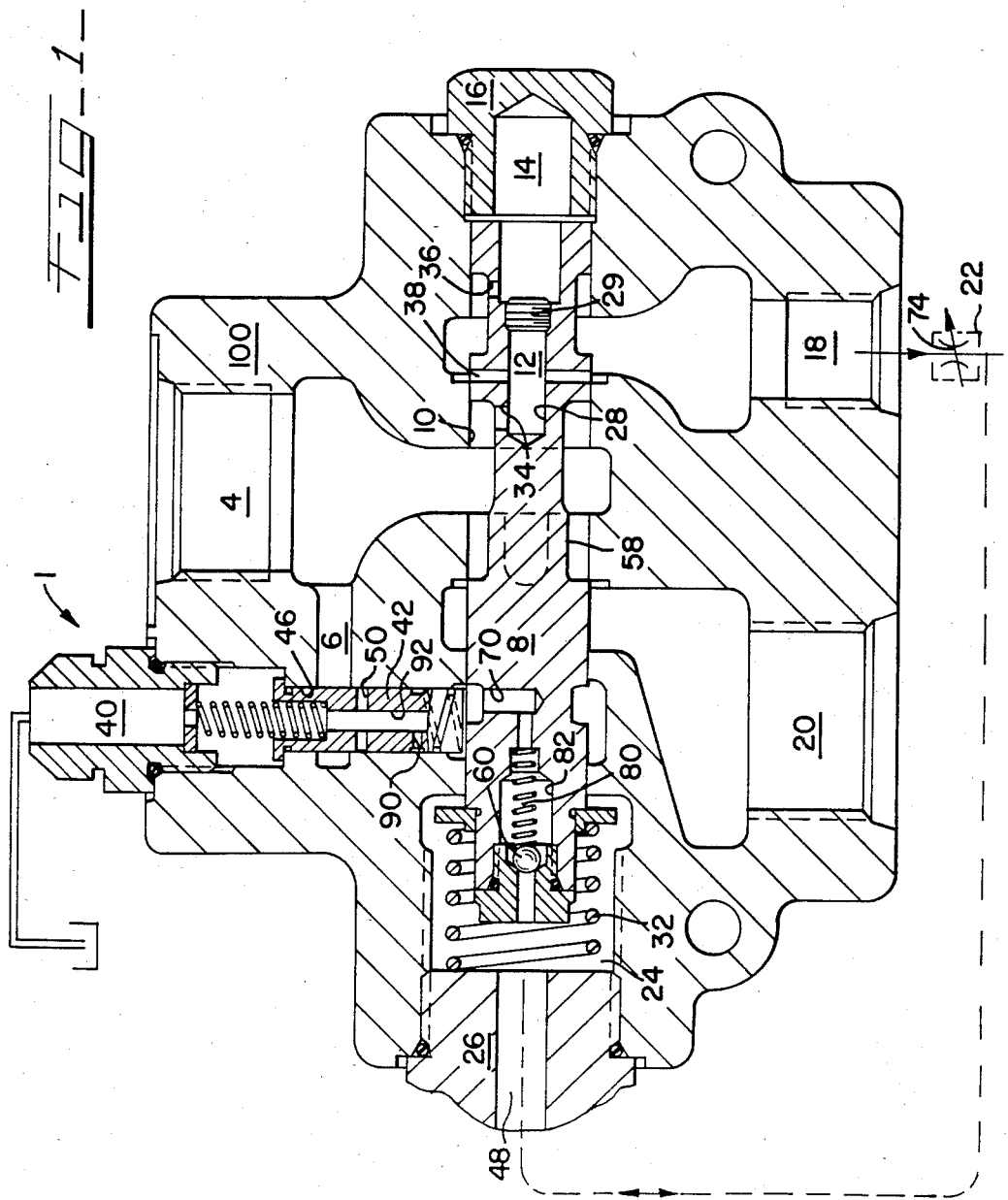

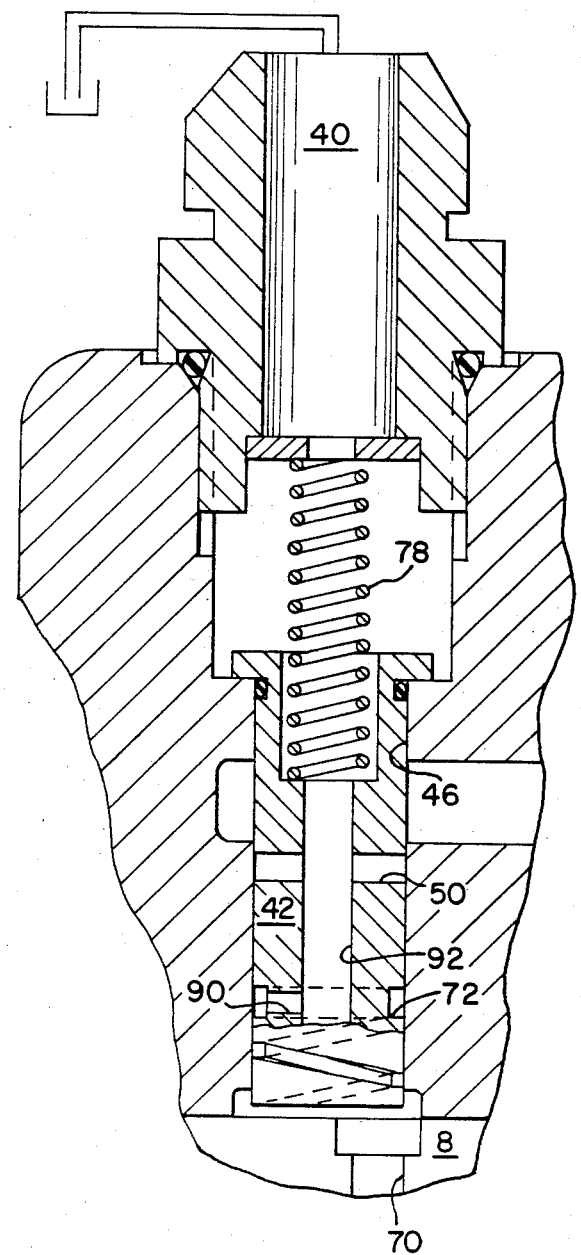

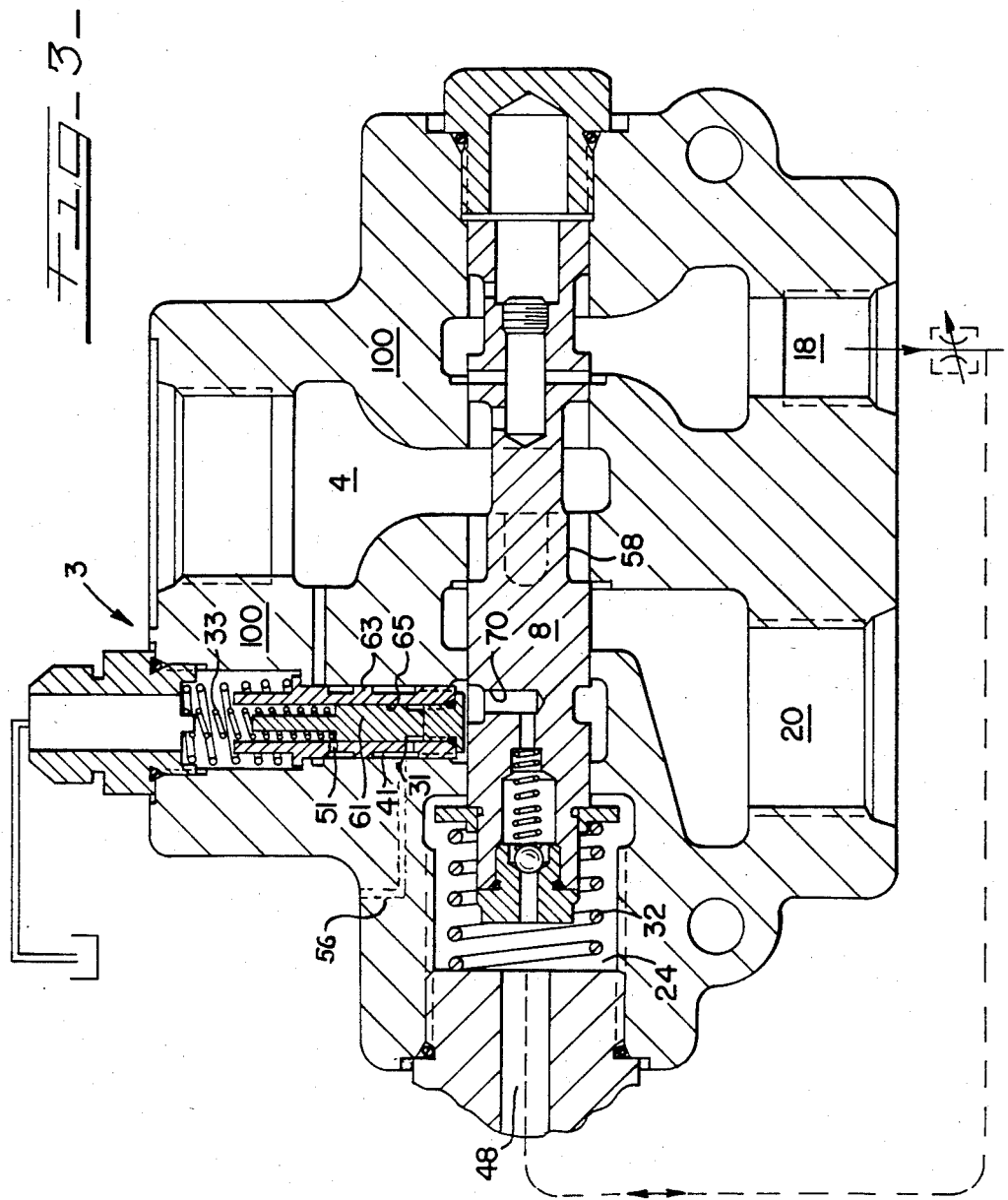

STABILIZER FOR PRIORITY FLOW DIVIDER VALVE

BACKGROUND OF THE INVENTION

Mobile vehicles such as tractors and other farm vehicles usually have hydraulically powered steering systems. The hydraulic steering system is comprised of a hydraulic pump, a hydraulic cylinder mounted to pivot the vehicle wheel, a directional flow control valve (or steering valve) for controlling flow from the pump to the cylinder. In most instances the pump will also power auxiliary hydraulic systems such as cylinders or hydraulic motors which control the implements on the vehicle, therefore a steering priority flow divider valve is provided in the hydraulic system. An example of a flow divider valve is illustrated in U.S. Pat. No. 3,916,932 issued to Thorson.

The priority valve divides the hydraulic flow between the steering system and the auxiliary systems of the vehicle. Safety considerations mandate that the priority valve give priority to the flow demands of the steering system over the flow demand of the auxiliary systems. When the total flow demand of the vehicle hydraulic system is beyond the capacity of the pump, the flow demand of the steering system is met first before any flow is delivered to the auxiliary systems.

Often the pump utilized in such a hydraulic system as described above, is a variable displacement pump. In some hydraulic systems the variable displacement pump will have a compensator, wherein the variable displacement pump will only supply the combined flow demanded by the steering system, auxiliary system and leakage. The compensator senses the load pressure of the complete hydraulic system and maintains the variable displacement pump output pressure at a preset level above the load pressure. When there is no load the variable displacement pump idles at the preset standby pressure. However, due to internal flow characteristics of the compensator, the standby pressure usually jumps to a level beyond the preset level when the pump displacement (or the swash angle) is very close to zero.

There are two main problems associated with the above noted system. If the steering wheel is rapidly turned to the left, then to the right, then to left again, such as in an avoidance maneuver, the variable displacement pump will first stroke towards maximum displacement, then rapidly destroke to almost zero displacement, and then again stroke towards maximum displacement.

In the above maneuver the compensator will rapidly go from a lower preset pressure differential to a higher pressure differential pressure as the variable displacement pump's displacement approaches zero. The aforementions fluctuation in compensator differential pressure causes an instantaneous pressure imbalance at the priority valve which is felt as a pulsation in the pump, steering system and the hydraulic lines feeding the steering system. The above noted pressure pulsation is highly undesirable.

When the auxiliary system is also demanding pump flow, the pulsation is significantly diminished because the variable displacement pump is not allowed to go to zero displacement even during an avoidance maneuver.

The priority valve, which is constantly trying to supply the steering system with whatever flow is demanded, can often experience unstable operation. The above instability is manifested in the form of a pressure pulsation which is felt in the vehicle tires during steering operation. The pressure pulsation in the tires is undesirable.

SUMMARY OF THE INVENTION

To overcome the prior noted problems, of priority flow divider valves the present invention is brought forth. The present invention is a priority valve which has the added feature of a stabilizer. The valve comprises three major components. The first component is a housing with a plurality of bores and passages. The second major component is a supply valve spool which is slideably mounted within a longitudinal bore within the housing. The third component is a bypass valve spool which is slideably mounted within another bore of a housing. The valve functions in such a manner that rapid changes and steering system demand are not allowed to immediately cause the displacement of the variable displacement pump to go to zero. The above is accomplished by delaying or retarding the hydraulic signal which causes pump displacement go to zero in instances of rapid changes in steering system demand. The priority valve supply spool is designed in a manner to stabilize flow demands, to decrease or eliminate pressure pulsation when the steering system is in operation.

It is an object of the present invention to provide a priority valve which maintains the flow required by the steering system of a vehicle. It is a desire of the present invention to provide a priority valve which aids in preventing the displacement of a variable displacement pump (with a compensator) from going to zero displacement in a rapid avoidance type maneuver by the steering system. It is a desire of the present invention to provide a priority valve with increased stability when used in conjunction with steering operations. It is another desire of the present invention to provide a priority flow divider valve with increased stabilization without allowing hydraulic load flow to be a function of the pump pressure, thereby retaining load sensing characteristics of the hydraulic system.

Other objects, desires and advantages of the present invention will become apparent to those skilled in the art as the nature of the invention is better understood from the accompanying drawings and the detailed description.

BRIEF DESCRIPTION OF THE DRAWINGS

FIG. 1 is a sectional view of one preferred embodiment of the present invention;

FIG. 2 is an expanded view of the bypass valve spool as shown in FIG. 1; and

FIG. 3 is a sectional view of another preferred embodiment of the present invention wherein bypass flow is prevented when auxiliary flow is present.

DETAILED DESCRIPTION OF THE DRAWINGS

FIG. 1 is a sectional view of an embodiment of the present invention. The priority flow divider valve 1 has three main components, the housing 100, the supply valve spool 8 and the bypass valve spool 42. Housing 100 has a plurality of bores and passages including a first bore 10 and a second bore 46. In most instantances the first bore 10 and the second bore 46 will be comprised of a plurality of diameters and the first bore 10 will be generally longitudinal. Second bore 46 fluid communicates with the first bore 10 and is usually intersecting with first bore 10. Housing 100 has a first fluid inlet passage 4, a first fluid outlet passage 18, a second fluid outlet passage 20 and a third fluid outlet passage 40. Housing 100 also has a first signal passage 48 and a bypass passage 6 which intersects with the first inlet passage 4 and said second bore 46. First inlet passage 4, first outlet passage 18, second outlet passage 20, and first signal passage 48, all intersect with the first bore 10. In the embodiment illustrated in FIG. 1 the second bore 46 also intersects with the first bore 10, and the second bore 46 is essentially coterminous with the third outlet passage 40.

Priority flow divider valve 1, is fluidly connected to the steering valve 22 via the first outlet passage 18 and the signal passage 48. Steering valve 22 is a variable resistance control valve for the primary demand hydraulic circuit (in this case the steering system). In most steering applications the steering valve is a directional control type valve.

The first bore 10 is sealed by the first seal 16 and the second seal 26. In an alternative embodiment to the present invention either first seal 16 or second seal 26 may be formed from the housing 100 itself, in lieu of the double insertable seals as shown in FIG. 1.

Second outlet passage 20 is provided for connection to auxiliary components on the vehicle or tractor, such as hydraulic cylinders, motors and other various components. Third outlet passage 40 is provided for connection to the low pressure lubrication, reservoir or to the hydraulic system drain. In an alternative embodiment a drain may be added which intersects with the second bore 46. First inlet passage 4 is connected to the output of a source of pressurized hydraulic fluid, usually a variable displacement piston hydraulic pump with pressure and flow compensation.

Supply valve spool 8 is slideably mounted within the first bore 10 between first and second seals 16 and 26 respectively. Movement of the supply valve spool 8 allows for selective fluid communication between the first inlet passage 4 and the first and second outlet passages 18 and 20 respectively. Valve spool 8 also has a first interior passage 12 which allows fluid communication between the first inlet passage 4 and the first outlet passage 18. Chamber 14 is defined by the first bore 10 and said first seal 16. Valve spool 8 also has a second interior passage 80 which allows fluid communication between the steering valve 22 and the second bore 46 via first signal passage 48 and second pressure chamber 24. Second chamber 24 is defined by the second seal 26 and the first bore 10. Spring 32, captured in the second chamber 24 pushes the supply valve spool 8 to the right to bias the supply valve spool 8 to a preselected position.

Supply valve spool first interior passage 12 is comprised of a generally first axial bore 28 and the intersecting first radial bore 34 and radial metering orifices 38. In the embodiment illustrated in FIG. 1, the supply valve spool 8 is provided with a plurality of generally radial metering orifices 38.

Dividing first bore 28 is plug member 29. Plug 29 allows a first pressure chamber 14 to be formed between first seal 16 and first bore 10. Supply valve spool third radial orifice 36 allows the pressure of first outlet 18 to interact within first pressure chamber 14.

Supply valve spool 8 is also provided with the metering notches (sometimes referred to as landings) 58 allowing fluid communication between the first inlet passage 4 and the second outlet passage 20 when the valve spool 8 is in a preselected position. (Note the preselected positions mentioned herein relate to design criteria. The preselected position of the supply spool valve 8 which allows fluid communication between the first inlet passage 4 and the outlet passage 20, need not be identical with the preselected position which allows fluid communication through the metering orifice 38 or the neutral position of valve spool 8 due to biasing of the spring 32.

Supply valve spool second interior passage 80 is comprised of a generally axial bore 82 with a plurality of diameters which intersects with a generally radial bore 70.

Check valve 60 is provided to allow fluid communication from the second chamber 24 (steering valve 22) to second bore 46, while at the same time preventing flow in the opposite direction. In the embodiment illustrated in FIG. 1 the check valve 60 comprises a ball valve biased by a spring captured in the supply valve spool second interior passage 80.

Referring to FIGS. 1 and 2, bypass valve spool 42 is slideably mounted within the second bore 46. Bypass valve spool 42 has a generally second radial bore 50 which intersects with the bypass valve spool axial bore 92. Bypass valve spool axial bore 92 communicates with the third outlet 40. In its neutral position, bypass valve spool 42 is biased by the coil spring 78, wherein bypass valve spool second radial bore 50 is biased out of alignment with bypass passage 6 to prevent fluid communication between the bypass passage 6 and the third outlet 40.

Bypass valve spool 42 has a flow channel which provides for restricted fluid communication between the first bore 10 and the third fluid outlet 40. In the embodiment illustrated in FIG. 1 the flow channel comprises the helical grooves 72 along the bypass valve spool 42 circumferential surface, and bypass valve spool first radial bore 90 and axial bore 92.

In operation, pump flow is received through the first inlet passage 4. Via the first bore 10 and the first oulet passage 18, pump flow is fed to the primary demand valve or steering valve 22. Pump flow is delivered to the auxiliary functions from the second fluid outlet 20. The steering valve 22 has a variable orifice 74 which is proportional to the displacement of the supply valve spool 8 as will be explained. The pressure at the supply side of the steering valve 22 is equal to the pressure in the first pressure chamber 14. The pressure of the demand side of the steering valve 22 is equal to the pressure in the second pressure chamber 24.

When the steering valve 22 is in neutral, the pressure in the second chamber 24 is zero. Orifice 74 is essentially blocked and a very small leakage flow is usually allowed in the steering valve in neutral. The pressure in the first chamber 14 will exceed the pressure in the second chamber 24 by the extent of the pressure force exerted upon the supply valve spool 8 by coil spring 32. When it is desired to increase the flow rate of hydraulic fluid to the steering system from neutral by opening the steering valve 22 and the variable orifice 74, the demand side pressure will increase and will tend to be equal to the pressure in chamber 14, the spring 32 will cause the supply valve spool 8 to be displaced to the right. The movement of the supply valve spool 8 to the right increases the amount of fluid flowing into the first outlet 18 from the metering orifices 38. Supply valve spool 8 will come to an equilibrium when flow to the steering cylinder causes enough pressure drop across orifice 74 to balance spring 32.

If the variable orifice 74 is open further, the supply valve spool 8 will move slightly further to the right, opening more of metering orifice 38, and increasing flow to first outlet passage 18 and maintaining a constant pressure differential across orifice 74 in the steering valve 22. Since pressure differential over the steering valve 22 remains constant, flow is a function of the setting of the differential orifice 74 and the spring load of the spring 32. Therefore, flow to the steering system (i.e. cylinder) is not dependent upon pump pressure or load pressure. Of course the above is true only when the pressure of the pump is sufficiently higher than the pressure of the load for the system to operate properly.

After the flow demands of the steering system have been met, the variable orifice 74 is closed and the supply valve spool 8 shifts to the left to increase available hydraulic supply available to the auxiliary systems via the metering notches 58 and the second fluid outlet 20.

The present invention as illustrated in FIG. 1 improves stability for standard steering maneuvers because metering of hydraulic fluid which flows through the first outlet passage 18 is accomplished through the radial orifices 38 in lieu of metering lands. With the radial orifices 38, flow forces are low and the pressure drop across the metering edge is kept small by maintaining a relatively high spring load for the spring 32. The priority valve 1 remains a true load sensing valve since only load pressure is fed to the second chamber 24.

An important feature of this priority valve 2 is the time delay bypass arrangement which prevents the pump from complete de-swashing, even in an avoidance maneuver. Whenever the vehicle steering is operated by use of the steering valve 22, the pressure in the signal passage 48 and the second chamber 24 rises. The increase in pressure causes the check valve 60 to open up, allowing fluid to flow through the supply valve spool second interior passage 80 and cause the bypass valve spool 42 to move upwardly, aligning the bypass valve spool second radial bore 50 with the bypass passage 6. When the bypass valve spool second radial bore 50 aligns with the bypass passage 6, a bypass flow is created between the first inlet passage 4 and the third outlet passage 40. If during the steering maneuver the pressure in second chamber 24 drops to zero, the bypass valve spool 42 will attempt to come back to the lower position, being biased by the spring 78. However, the check valve 60 prevents the free downward travel of the bypass spool valve 42. The hydraulic fluid trapped at the lower end of the supply valve spool 42 slowly escapes to the third fluid outlet 40 via flow channel helical grooves and annulus 72 on the outer circumference of supply valve spool 42 and supply valve spool first radial and axial passages 90 and 92 respectively. The bypass of the first interior passage 6 will continue until bypass valve spool second radial bore 50 is covered up. This will take some period of time depending on specific design criteria and helical groove 72 sizing, therefore complete de-swashing of the variable displacement pump will be delayed. Thus, during very quick steering maneuvers the bypass will be maintained. This is similar to creating an artificial auxiliary flow demand which always smooths out the steering. The check valve 60 is set to open at a predetermined pressure high enough to prevent false triggering of supply valve spool 42.

FIG. 3 illustrates an alternative embodiment of the present invention. With this embodiment, bypass flow is eliminated when there is an auxiliary load, therefore lowering flow demand of the system when the steering and auxiliary circuits are simultaneously in operation. The priority valve 3 has added to the housing an auxiliary signal inlet passage 56. The bypass valve spool 63 has a first axial bore 65 with intersecting first and second radial bores 31 and 51 respectively. Bypass valve spool first landing or preferably annulus 41 allows fluid comunication between the auxiliary signal inlet passage 56 and the bypass valve spool axial bore 65. Slideably mounted within the bypass valve spool axial bore 65 is an auxiliary piston 61. Auxiliary piston 61 is biased to allow flow through the bypass valve spool second radial orifice 51. Pressure in the auxiliary signal input passage 56 will act to cause the auxiliary piston 61 move up and to block off the bypass valve spool second radial orifice 51, thereby preventing bypass flow when an auxiliary system is being utilized. Auxiliary piston return spring 33 is sufficiently strong to prevent false triggering of the auxiliary piston 61. It is apparent to those skilled in the art of the various modifications in bypass spool construction, means of biasing, location of biasing devices and diameter modifications of the second bore 46 which can be utilized to achieve the same function as illustrated in the embodiments of FIGS. 1 and 3.

The present invention has been explained mainly in environments of hydraulic steering systems for mobile vehicles, however, the present invention can be utilized on many other hydraulic systems where flow priority is essential. As discussed in this disclosure the primary flow control valve is a steering valve, however, it is apparent to those skilled in the art that the primary flow control valve may be other than a steering valve as mentioned in this application.

While a few embodiments of the present invention have been explained, it will be apparent to those skilled in the art of the various modifications which can be made to the present invention without departing from the spirit or scope of this application as encompassed by the folowing claims.

What is claimed is:

1. A priority flow divider valve for use with a primary demand control valve comprising:
   a housing means including a first inlet, a first outlet for fluid communication with the primary demand valve, a second outlet, a bypass passage having fluid communication with said first inlet, a first bore and a second bore;
   a supply valve spool biased within said first bore providing selective fluid communication between said first inlet and said first and second outlets;
   means for fluid communication from the demand valve to said second bore;
   means for preventing fluid communication from said second bore to the demand valve;
   a bypass valve spool mounted within said second bore biased to prevent fluid commuication between said bypass passage and said second bore, said bypass valve spool allowing fluid communication between said bypass passage and said second bore during fluid communication from the demand valve to said second bore; and
   means for retarding displacement of said bypass valve spool from a position allowing fluid communication between said bypass passage and said second bore to a position preventing fluid communication between said bypass passage and said second bore.

2. An apparatus as recited in claim 1, wherein said priority valve includes an auxiliary signal inlet intersecting with said second bore and wherein said priority valve is provided with means to prevent fluid communication between said bypass passage and said second bore during the existence of a pressure signal in said auxiliary signal inlet.

3. An apparatus as recited in claim 1, wherein said supply valve spool has a first interior passage allowing fluid communication between said first inlet and said first outlet, and said supply valve spool having a second interior passage allowing fluid communication between the demand valve and said second bore.

4. An apparatus as recited in claim 1, wherein said means for retarding the displacement of said bypass spool comprises a flow channel allowing restricted fluid communication between the demand valve and said second bore.

5. An apparatus as recited in claim 3, wherein said means for preventing fluid communication includes a check valve which further comprises a ball valve mounted within said second interior passage.

6. A priority flow divider valve with a stabilizer, for use in connection with a primary demand control valve, said priority flow divider valve comprising:
 a housing with a plurality of bores and passages including a first bore, a second bore, said second bore having fluid communication with said first bore, a first inlet, a first outlet, a second outlet, a first signal passage, a third outlet, and said first, and second outlet passages intersecting with said first bore, and said first inlet and said first signal passages intersecting with said first bore, and said first outlet and said first signal inlet being capable of having fluid communication with the primary demand control valve and said housing also having a first and second seal within said first bore, and said first seal defining a first pressure chamber in said first bore and said second seal defining a second pressure chamber in said first bore, and said housing also having a bypass passage intersecting with said first inlet and said third outlet;
 a supply valve spool slideably mounted within said first bore between said first and second seals wherein movement of said supply valve spool allowing selective fluid communication between said first inlet and said first and second outlets, said first supply valve spool having a first interior spool passage allowing fluid communication between said first inlet and said first outlet and said supply valve spool having a third interior spool passage allowing fluid communication between said first inlet and said first pressure chamber, and said supply valve spool having a second interior passage allowing fluid communication between said second pressure chamber and said second bore, and said first valve spool being biased to a preselected position;
 means for biasing said supply valve spool to a preselected position;
 a check valve allowing fluid communication from said second chamber to said second bore and preventing fluid communication from said second bore to said second chamber;
 a bypass valve spool slideably mounted in said second bore said bypass valve spool being biased to a position within said second bore preventing fluid communication between said bypass passage and said third outlet and said bypass valve spool allowing fluid communication between said bypass passage and said third outlet when said check valve is allowing fluid communication between said second pressure chamber and said second bore, and said bypass valve spool having a flow channel allowing restricted fluid communication between said first bore and said third outlet; and
 means for biasing said bypass valve spool.

7. An apparatus as recited in claim 6, wherein said first bore has a plurality of diameters.

8. An apparatus as recited in claim 6, wherein said second bore has a plurality of diameters.

9. An apparatus as recited in claim 6, wherein said means for biasing said supply valve spool to a preselected position is a coil spring.

10. An apparatus as recited in claim 9, wherein said coil spring is captured within said second pressure chamber.

11. An apparatus as recited in claim 6, wherein said means for biasing said bypass valve spool is a coil spring.

12. An apparatus as recited in claim 6, wherein said supply valve spool first interior passage comprises a first axial bore in said supply valve spool, and said supply valve spool having a first radial bore intersecting with said supply valve spool first axial bore and said first inlet, and said supply valve spool having a generally radial metering orifice intersecting with said supply valve spool first axial bore, said metering orifice allowing fluid communication between said first supply valve spool axial bore and said first outlet when said supply valve spool is at a predetermined position.

13. An apparatus as recited in claim 12 wherein there are a plurality of radial metering orifices.

14. An apparatus as recited in claim 6 wherein said supply valve spool has metering notches allowing fluid communication between said first inlet and said second outlet when said supply valve spool is at a predetermined position.

15. An apparatus as recited in claim 6 wherein said supply valve spool second interior passage comprises a second axial bore, said supply valve spool second axial bore intersecting with said second chamber and said supply valve spool having a second radial bore intersecting with said supply valve spool second axial bore opposite said second chamber, and said supply valve spool second radial bore intersecting with said housing second bore.

16. An apparatus as recited in claim 15 wherein said supply valve spool second axial bore has a plurality of diameters, and said check valve comprises a ball valve biased by a spring captured within said supply valve spool second axial bore.

17. An apparatus as recited in claim 6 wherein said bypass valve spool flow channel comprises a helical groove in said piston circumferential surface and said bypass valve spool also having a first radial bore intersecting with said helical grooves and an axial bore intersecting with said first radial orifice and said third outlet.

18. An apparatus as recited in claim 6 wherein said bypass valve spool has an axial bore intersecting with said third outlet and a second radial bore intersecting with said bypass valve spool axial bore and said bypass valve spool second radial bore being aligned with said bypass passage when said bypass valve spool is in a predetermined position allowing fluid communication between said bypass passage and said third outlet.

19. An apparatus as recited in claim 6 wherein said housing has an auxiliary signal inlet passage, said auxiliary signal inlet intersecting with said second bore, and said bypass valve spool having an axial bore and said bypass valve spool also having a first radial bore intersecting with said bypass valve spool axial bore, said bypass valve spool having a first landing intersecting with said bypass valve spool first radial bore, and said bypass valve spool first landing and first radial bore allowing fluid communication between said auxiliary signal inlet and said bypass valve spool axial bore, and said bypass valve spool having a second radial bore, said bypass valve spool second radial bore allowing fluid communication between said bypass passage and said bypass valve spool axial bore when said bypass valve spool is in a predetermined position, and wherein there is an auxiliary piston slideably mounted within said bypass valve spool axial bore, said auxiliary piston being biased to a position allowing fluid communication between said housing bypass passage and said third outlet through said bypass valve spool second radial bore and said bypass valve spool axial bore, and wherein fluid pressure in said auxiliary signal inlet acts upon said auxiliary piston to position said auxiliary piston to a location to close off said bypass valve spool second radial bore from said bypass passage.

20. A priority flow divider valve with a stabilizer, for use in connection with a steering directional control valve, said priority flow divider valve comprising:
a housing with a plurality of bores and passages including a first bore, a second bore intersecting with said first bore, and a first inlet, a first outlet, a second outlet, a signal inlet, a third outlet all intersecting with said first bore, and said first outlet passage and said first signal passage being capable of having fluid communication with the steering directional control valve, and said housing also having first and second seals within said first bore defining first and second pressure chambers in said first bore, and said housing also having a bypass passage intersecting with said first inlet and said third outlet;
a supply valve spool slideably mounted within said first bore between said first and second seals wherein movement of said supply valve spool allowing selective fluid communication between said first inlet and said first and said second outlets, said supply valve spool having a first interior spool passage with a plurality of generally radial metering orifices allowing fluid communication between said first inlet and said first outlet when said supply valve spool is in a predetermined position, and said supply valve spool having a second interior passage allowing fluid communication between said second pressure chamber and said second bore, and said supply valve spool being biased by a coil spring captured within said second pressure chamber to a preselected position;
a unidirectional valve mounted within said supply valve spool second interior passage allowing fluid communication from said second chamber to said second bore; and
a bypass valve spool slideably mounted in said second bore said bypass valve spool being biased by a coil spring to a position within said second bore to prevent fluid communication between said bypass passage and said third outlet, and said bypass valve spool allowing fluid communication between said bypass passage and said third outlet when said unidirectional valve is allowing fluid communication between said second pressure chamber and said second bore, and said bypass valve spool having helical flow channels on its periphery and a first radial bore intersecting with said helical flow channels, said bypass valve spool also having an axial bore intersecting with said bypass valve spool first radial bore and said third outlet, and said helical flow channels, said first radial bore and second radial bore allowing restricted fluid communication between said first bore and said third outlet.

21. A priority flow divider valve with a stabilizer, for use in connection with a steering directional control valve, said priority flow divider valve comprising:
a housing with a plurality of bores and passages including a first bore, a second bore intersecting with said first bore, a first inlet, a first outlet, a second outlet, a first signal inlet, a third outlet all intersecting with said first bore, and said first outlet and said first signal passage being capable of having fluid communication with the steering directional control valve, and said housing also having first and second seals within said first bore, defining first and second pressure chambers in said first bore, and said housing also having a bypass passage intersecting with said first inlet and said third outlet, and said housing having an auxiliary signal inlet intersecting with said third outlet;
a supply valve spool slideably mounted within said first bore between said first and second seals wherein movement of said supply valve spool allows for selective fluid communication between said first inlet and said first and second outlets, said supply valve spool having a first interior spool passage allowing fluid communication between said first inlet and said first outlet, and said supply valve spool having a second interior passage allowing fluid communication between said second pressure chamber and said second bore, and said supply valve spool being biased to a preselected position;
a check valve allowing fluid communication from said second pressure chamber to said second bore and preventing fluid communication from said second bore to said second chamber;
a biased bypass valve spool slideably mounted in said second bore, said bypass valve spool having a generally axial bore intersecting with said third outlet, and said bypass valve spool having a first radial bore intersecting with said bypass valve spool axial bore, and a second radial bore axially spaced from said bypass valve spool first radial bore, said bypass valve spool second radial bore intersecting with said bypass valve spool axial bore, and said bypass valve spool having an annulus intersecting with said bypass valve spool first radial bore, and said bypass valve spool annulus and said bypass valve spool first radial bore allowing fluid communication between said auxiliary signal inlet and said bypass valve spool axial bore, and said bypass valve spool allowing fluid communication between said bypass passage and said third outlet through said bypass spool second radial bore and said bypass spool axial bore when said check valve is allowing fluid communication between said second pressure chamber and said second bore, and said bypass valve spool having a flow channel allowing restricted fluid communication between said first bore and said auxiliary signal inlet;

means for biasing said bypass valve spool to a predetermined position;
an auxiliary piston slideably mounted within said bypass valve spool axial bore said auxiliary piston being biased in a position allowing fluid communication between said bypass passage and said third outlet through said bypass valve spool second radial bore and said bypass valve spool axial bore, and wherein fluid pressure in said auxiliary signal inlet acts upon said auxiliary piston to position said auxiliary piston to a location within said bypass valve spool axial bore to close off said bypass valve spool second radial bore thereby preventing fluid communication between said bypass passage and said third fluid outlet; and
means for biasing said auxiliary piston.

* * * * *